US005415828A

United States Patent [19]

Watanabe et al.

[11] Patent Number: 5,415,828

[45] Date of Patent: May 16, 1995

[54] JIG AND METHOD FOR ISOSTATICALLY PRESSING CERAMIC POWDER

[75] Inventors: Keiichiro Watanabe; Hideki Shimizu, both of Nagoya, Japan

[73] Assignee: NGK Insulators, Ltd., Nagoya, Japan

[21] Appl. No.: 158,485

[22] Filed: Nov. 29, 1993

Related U.S. Application Data

[60] Division of Ser. No. 32,695, Mar. 17, 1993, abandoned, which is a continuation of Ser. No. 845,793, Mar. 9, 1992, abandoned, which is a continuation of Ser. No. 506,038, Apr. 9, 1990, abandoned.

[30] Foreign Application Priority Data

Apr. 14, 1989 [JP] Japan .................................. 1-94364

[51] Int. Cl.[6] ............................................. B29C 43/10

[52] U.S. Cl. .................................. 264/544; 264/570; 264/109; 425/405.2

[58] Field of Search ............... 264/544, 570, 109, 123, 264/500; 425/405.2

[56] References Cited

U.S. PATENT DOCUMENTS

| | | | |
|---|---|---|---|
| 1,806,861 | 5/1931 | Owen | 425/DIG. 44 |
| 2,363,107 | 11/1944 | Young | 425/389 |
| 2,706,309 | 4/1955 | Lampman | 425/405.1 |
| 3,158,089 | 11/1964 | Fillol | 425/389 |
| 3,251,908 | 5/1966 | Wilenius et al. | 425/405.1 |
| 3,284,858 | 11/1966 | Taccone | 425/405.1 |
| 3,543,336 | 12/1970 | Feeney | 425/405.1 |
| 3,596,869 | 8/1971 | Humphrey | 425/405.1 |
| 3,656,946 | 4/1972 | Inque et al. | 75/226 |
| 4,334,850 | 6/1982 | Garabedian | 425/389 |
| 4,350,486 | 9/1982 | Croseck et al. | 425/405.2 |
| 4,518,341 | 5/1985 | Suffa | 425/405.2 |
| 4,588,368 | 5/1986 | Buhler et al. | 425/405.2 |
| 4,888,144 | 12/1989 | Matsushita et al. | 264/120 |

FOREIGN PATENT DOCUMENTS

| | | | |
|---|---|---|---|
| 1562890 | 3/1969 | France . | |
| 3239815 | 5/1984 | Germany | 425/405.2 |
| 63-270318 | 11/1988 | Japan . | |
| 63-270346 | 11/1988 | Japan . | |
| 63-270347 | 11/1988 | Japan . | |
| 64-57534 | 3/1989 | Japan . | |
| 64-59719 | 3/1989 | Japan . | |
| 184825 | 8/1963 | Sweden | 425/DIG. 19 |
| 313700 | 6/1929 | United Kingdom . | |
| 171538 | 5/1965 | U.S.S.R. . | |

*Primary Examiner*—Mary Lynn Theisen
*Attorney, Agent, or Firm*—Adduci, Mastriani, Schaumberg & Schill

[57] ABSTRACT

A jig for isostatic-pressing a ceramic feed powder to form a planar ceramic green body with a pressure of more than 300 $kgf/cm^2$. The jig includes a mold in the form of a frame surrounding a cavity open at two sides and being made of a material with a Young's modulus greater than $5\times10$ $kgf/cm^2$, a pair of pressure-medium diaphragms with each pressure-medium diaphragm arranged opposite one of the open sides of the cavity to seal the open sides of the cavity, and a pair of pressure-transfer plates with each pressure-transfer plate including at least one through hole and being placed on an outer surface of one of the pressure-medium diaphragms.

11 Claims, 2 Drawing Sheets

JIG AND METHOD FOR ISOSTATICALLY PRESSING CERAMIC POWDER

This application is a divisional of application Ser. No. 08/032,695, filed Mar. 17, 1993, now abandoned, which is a continuation of application Ser. No. 07/845,793, filed Mar. 9, 1992, now abandoned, which is a continuation of application Ser. No. 07/506,038, filed Apr. 9, 1990, now abandoned.

BACKGROUND OF THE INVENTION AND RELATED ART STATEMENT

The present invention relates to jigs and methods for isostatic-pressing ceramics. More particularly, this invention relates to jigs for isostatic-pressing ceramics using cavity molds for the formation of plates and methods thereof.

In manufacturing ceramics, there are a variety of shaping methods in accordance with the desired shape and the purpose of use of products. Pressing by use of metal molds is one of the shaping methods that are suitable for mass-production since it can be mechanically operated to form shaping products with excellent dimensional accuracy. In the pressing by use of metal molds, wet, semi-wet or dry raw materials for ceramics are filled into the metal mold, and pressurized to form products of a desired shape. Pressure is applied with a hand press, friction press, and hydrostatic press. When the density is low for the product obtained with pressing using metal molds, isostatic-pressing has increasingly been employed in which said product is further compacted by applying higher hydrostatic pressure after it has been sealed with air-tight rubber diaphragm.

In the conventional method for the production of plates by means of pressing, pressures of 50 to 200 $kgf/cm^2$ are generally applied in metal molds. When higher density of products is desired, isostatic-pressing in which higher hydrostatic pressures of more than 300 $kgf/cm^2$ are applied on the pre-pressing material in a pressure bag such as a soft, elastic rubber tube or an ice bag is followed after preliminary pressing in metal molds at pressures of 50 to 200 $kgf/cm^2$.

When large size products such as ceramic plates are produced by the conventional pressing method, pressures of 50 to 200 $kgf/cm^2$ obtained by a metal dye pressing are too low to give sufficient strength to the shaping green body, thus often resulting in the green body damage or wreckage during pressing operation especially when the product is removed from the mold and the shaping product not being obtainable. Namely, pressures of around 50 to 200 $kgf/cm^2$ applied normally in the conventional metal dye pressing method are not enough to obtain large size ceramic green body because they can not give sufficient strength to the green body to avoid damages or wreckages during the removing operation and the followed handling. Therefore, it is necessary to compress even the feed powder at high pressures of more than 300 $kgf/cm^2$ in order to provide large strength to the green body necessary for avoiding damage during pressing operation. However a large and costly system, which is industrially unpractical, is required in order to achieve the pressure higher than 300 $kgf/cm^2$ in metal dye pressing method.

SUMMARY OF THE INVENTION

It is an object of the present invention to provide an improved ceramics shaping method in which large size plates can be formed in a single stage of the isostatic-pressing and is based on the fact that the isostatic-pressing method is advantageous to obtain high pressure easily through pressure media such as gases and liquids.

According to the present invention, there is provided a jig for the production of ceramics by means of isostatic-pressing. The jig has a cavity in the center of the mold and pressure diaphragms arranged on the both sides of said cavity. Another jig for the production of ceramics by means of isostatic-pressing is also provided which has a cavity in the center of the mold, pressure diaphragms arranged on the both sides of said cavity and a pressure-transferable plate with at least one penetrated hole placed on the outer surface of said pressure diaphragms.

A method for the production of ceramics by means of isostatic-pressing is also provided in which said jig is used to fill ceramic feed material into said cavity of the mold and pressure is isostatically applied from outside after an air-tight seal has been established between said pressure diaphragm and the frame of said mold.

According to the present invention, high pressures of more than 300 $kgf/cm^2$ can be applied on the ceramic feed powder by means of isostatic-pressing using a mold having a cavity. Therefore, since a large size ceramic green body with higher strength than produced by conventional metal mold press can be obtained, the problems of damage, wreckage, etc. during the removing operation and the followed handling of the green body can be solved.

The present invention is advantageous especially for the production of large size ceramic plates with excellent dimensional accuracy. This method provides minimum product loss and can be operated only in a single stage of isostatic-pressing without the use of the stage of metal mold press. Much higher pressure can be applied to the jig of the present invention for the production of large size plates compared with those of a conventional metal mold press.

In conventional isostatic-pressing methods, the whole of the mold with the shape of desired products has been pressurized in a pressure vessel, or hydrostatic pressure is applied from the whole outer circumference of the mold made of a flexible, pressure-transferable material such as rubber capable of maintaining its shape. On the other hand, the jig according to the present invention, which has newly been developed in particular to produce large size shaping ceramics, especially ceramic plates, is constructed in such a way as described beforehand and only the cavity in the center part of the mold is isostatically pressurized.

DETAILED DESCRIPTION OF PREFERRED EMBODIMENTS

Details of the present invention are explained below with reference to a specific embodiment. However it is to be noted that the description is illustrative and the invention is limited only by the appended claims.

Figure 1:
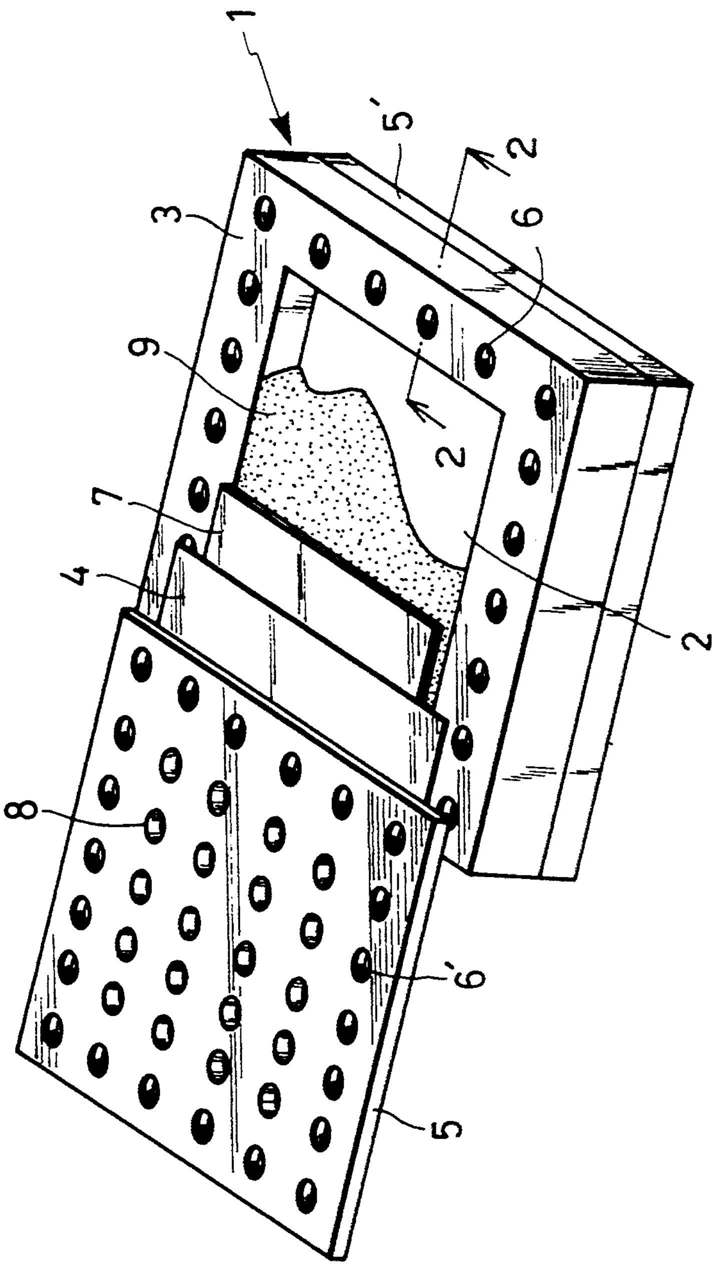
FIG. 1 is a perspective view of an embodiment of a jig for isostatic-pressing according to the present invention.
Figure 2:
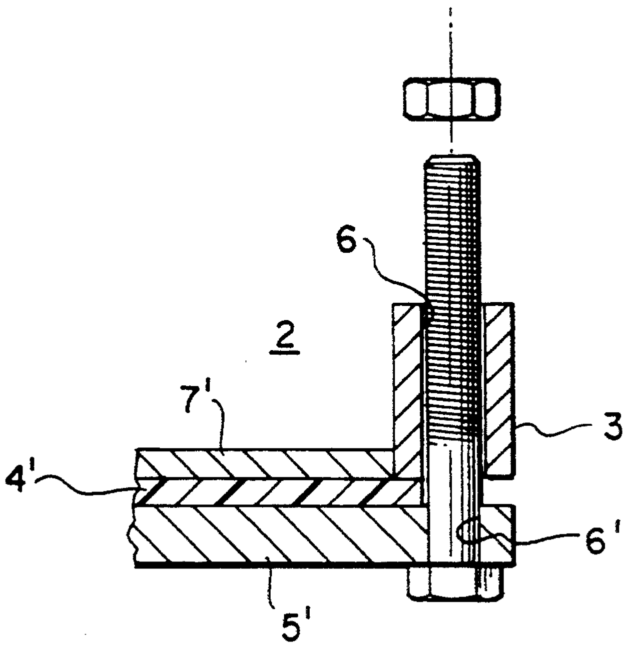
FIG. 2 is a sectional view taken along the line 2—2 of FIG. 1.

Referring to FIGS. 1 and 2, a mold 1 surrounds a cavity 2 having a depth of a constant value, the shape of which can be rectangular, circular or any other shape.

There are multiple bolt holes 6 along the outer perimeter 3 of the mold. Bolt holes 6' are also made on the supporting plates 5 and 5' to fasten the plates to the mold 1 with bolts 10. The mold 1 is made of an organic material such as urethane rubber or nylon as well as an inorganic material such as stainless steel or aluminum.

When pressures of more than 500 $kgf/cm^2$ are required for isostatic-pressing, the mold made of a common material with low Young's modulus such as rubber and or plastic can be replaced with a mold which is made of a material with a Young's modulus of more than $5\times10^3$ $kgf/cm^2$ so that no deformation develops on the mold and large size shaping plate without any crack can be produced with excellent dimensional accuracy.

However, when Young's modulus for the mold is less than $5\times10^5$ $kgf/cm^2$, the mold fails to maintain the shape of its cavity at pressures of more than about 500 $kgf/cm^2$, resulting in poor dimensional accuracy and defective products. In addition, upon relaxation after pressing, the mold unpreferably compacts the shaping product, often resulting in cracks on its surface. In manufacturing shaping products, after the lower side of the mold 1 has been arranged to form a cavity 2 by placing a pressure diaphragm 4' on supporting plate 5', arranging the mold 1 on top of the plate and diaphragm, passing bolts 10 upwardly through bolt holes 6' in the plate 5' and bolt holes 6 in the mold 1 and placing a protective sheet 7' as necessary on the pressure diaphragm 4', the feed powder 9, which has been added with a plasticizer, if necessary, is introduced to fill the cavity 2 of the mold. A protective sheet 7 is then placed on the filled powder as necessary. The sheet is then covered with a pressure diaphragm 4, for example, a soft rubber, on which a supporting plate 5 having perforated through holes 8 is placed. Pressure is transferred from the pressure medium through the holes 8. The supporting plates 5 and 5' are made of steel, for example. The mold is grasped with both of the supporting plates which are in turn fastened with the bolts 10 through bolt holes 6 for the mold and bolt holes 6' for the supporting plates 5 and 5'. In this manner the jig of the present invention is sealed to obtain air-tightness.

The protective sheets 7 and 7' used for preventing the filled feed powder from scattering as well as providing a uniform packing of the powder. A plastic such as nylon or acrylate is a preferred material for the sheet. Since they are used only for operational efficiency as mentioned above, the protective sheets can be omitted for the shaping purpose itself.

Any desired shaping product can be manufactured using a well-known isostatic pressure device and the jig of the present invention arranged in such a manner as described above for isostatic-pressing.

As used herein, the term "ceramics" is intended to mean conventional clay ceramics, and oxide, carbide and nitride ceramics, and includes oxide ceramic superconductor such as Y—Ba—Cu—O and Bi—Sr—Ca—Cu—O systems.

The present invention relates to a jig and method for the production of plate shaping from feed powder and can be operated only in a single stage of isostatic-pressing without the use of the stage of metal mold press. This invention can eliminate damage and wreckage of shaping products during shaping operation as often encountered in the prior art, and can produce large size ceramic shaping products, in particular large size ceramic plate with excellent dimensional accuracy and high strength.

EXAMPLE 1

In a jig illustrated in FIGS. 1 and 2, a soft rubber diaphragm was fixed on one side of a Type 304 stainless (SUS 304) metal mold 1 having a square cavity 2 with a dimension of 360×360×5 mm. After grinding in an aqueous solvent, granulated alumina powder was filled into the cavity 2. The surface of the filled cavity was then covered with a soft rubber diaphragm, and placed between two supporting plates 5 and 5' made of Type 304 stainless steel and having random-arranged perforated holes with a diameter of 10 mm. Those supporting plates 5 and 5' and the metal mold 1 were fastened with bolts 10 through bolt holes 6 and 6' to be held together. In this manner, the assembly thus obtained was pressurized to seal for air-tightness.

A pressure of 0.5 $tons/cm^2$ was applied with an cold hydrostatic press on the jig assembly filled with alumina powder. Then, the jig was disassembled to separate the supporting plates and the soft rubber diaphragm from the metal frame, from which a square, plate-like shaping product with a dimension of 360×360×5 mm was removed. The resultant shaping product was then sintered in an electric oven at a temperature of up to 1650° C. to form a sintered product of 320×320×4 mm.

The density and condition of the shaping products are shown in Table 1. The product density as shown in Table 1 is a relative density or the ratio, as expressed in percent, of its density to that of a shaping product made only of the oxide produced from the feed itself.

EXAMPLES 2–6

According to the same method as that of Example 1, shaping products were obtained using feed powder as shown in Table 1. No damage or deformation was observed in those shaping products. The density and condition of the product are shown in Table 1.

EXAMPLES 7–11

$Y_2O_3$, $BaCO_3$, and CuO in a mole ratio of $\frac{1}{2}$:2:3 were blended in a rotating mill and then dried in a spray dryer. The resultant blended powder was calcined at a temperature of 920° C. for 10 hours. The calcined bulk was then crushed and mixed with an organic solvent. The resultant slurry was fed to a spray dryer to obtain granules which were then filled in the jig shown in FIG. 1 in a manner similar to Example 1. High pressure as given in Table 1 was applied with a cold hydrostatic press on the jig assembly filled with the above particles. Thus, shaping plate were formed as shown Table 1. The resultant shaping was then sintered in an electric oven at a temperature of up to 960° C. to form a sintered product of about 320×320×4 mm. No curvature or calcining crack was found in those sintered products. The density and condition of the product thus obtained are shown in Table 1.

The sintered products thus obtained in these examples displayed the Meissner effect in liquid nitrogen.

EXAMPLES 12–14

Shaping process was conducted according to the same procedure as in Example 1 except for the materials of molds, shaping sizes and isostatic pressures as shown in Table 1. No curvature or calcining crack was found in those sintered products. The density and condition of the shaping product thus obtained are shown in Table 1.

Comparative Example

The same alumina particles as used in Example 1 were filled in a mold of 360×360×10 mm. A press was used to produce a shaping product at a pressure of 0.2 tons/$cm^2$. The resultant shaping was so low in strength that a satisfactory shaping product could not be formed. The product was wrecked when it was removed from the mold.

said pressure-medium diaphragms and said mold is established by clamping each pressure-medium diaphragm between a respective one of said pressure-transfer plates and a periphery of said mold.

6. A method for isostatically pressing a ceramic powder, said method comprising the steps of:

providing a mold in the form of a frame surrounding a cavity open at opposite sides of said frame and defining a periphery of said cavity;

TABLE 1

| Example No. | Powder for Mold | Material of Mold | Young's Modulus (kgf/$cm^2$) | Shaping Pressure (ton/$cm^2$) | Shaping Product Size (mm) | Shaping Product Density (%) | Shaping Product Condition |
|---|---|---|---|---|---|---|---|
| 1 | Alumina Granules | SUS304 | $20 \times 10^5$ | 0.5 | 360 × 360 × 5 | 55 | Good |
| 2 | Alumina Granules | SUS304 | $20 \times 10^5$ | 0.5 | 100 × 100 × 5 | 57 | Good |
| 3 | Alumina Powder | SUS304 | $20 \times 10^5$ | 0.5 | 360 × 360 × 10 | 56 | Good |
| 4 | Alumina Powder | SUS304 | $20 \times 10^5$ | 0.5 | 100 × 100 × 5 | 57 | Good |
| 5 | Zirconia Granules | SUS304 | $20 \times 10^5$ | 0.5 | 360 × 360 × 4 | 53 | Good |
| 6 | Zirconia Granules | SUS304 | $20 \times 10^5$ | 0.5 | 360 × 360 × 10 | 53 | Good |
| 7 | superconducting Granules | SUS304 | $20 \times 10^5$ | 0.5 | 360 × 360 × 5 | 51 | Good |
| 8 | superconducting Granules | SUS304 | $20 \times 10^5$ | 1.0 | 360 × 360 × 5 | 53 | Good |
| 9 | superconducting Granules | SUS304 | $20 \times 10^5$ | 1.5 | 360 × 360 × 5 | 54 | Good |
| 10 | superconducting Granules | SUS304 | $20 \times 10^5$ | 2.0 | 360 × 360 × 5 | 58 | Good |
| 11 | superconducting Granules | SUS304 | $20 \times 10^5$ | 2.5 | 360 × 360 × 5 | 59 | Good |
| 12 | Alumina Granules | Aluminum | $7.2 \times 10^5$ | 0.5 | 360 × 360 × 5 | 56 | Good |
| 13 | Alumina Granules | Nylon Resin | $3 \times 10^5$ | 0.3 | 360 × 360 × 5 | 53 | Good |
| 14 | Alumina Granules | Urethane Rubber | $2.5 \times 10^5$ | 0.3 | 360 × 360 × 5 | 54 | Good |
| Comparative Example | Alumina Granules | Metal Mold Press | $20 \times 10^5$ | 0.2 | 360 × 360 × 10 | 46 | Wrecked when removed |

What is claimed is:

1. A method for isostatic-pressing ceramic powder, said method comprising the steps of:

disposing ceramic powder in a cavity of a jig, said jig comprising a mold in the form of a frame having a cavity open at opposite sides of said frame and a pair of pressure-medium diaphragms arranged opposite said open sides of said cavity;

forming an airtight seal between said pressure-medium diaphragms and said mold; and shaping said powder by applying pressure isostatically from outside said jig.

2. The method for isostatic-pressing ceramic powder according to claim 1, in which said pressure-medium diaphragms are arranged after said open sides of said cavity have been covered with protective sheets.

3. A method for isostatic-pressing ceramic powder, said method comprising the steps of:

disposing ceramic powder in a cavity of a jig, said jig comprising a mold in the form of a frame having a cavity open at opposite sides of said frame, a pair of pressure-medium diaphragms arranged opposite said open sides of said cavity, and a pair of pressure-transfer plates having at least one pressure hole placed on the outer surface of said pressure-medium diaphragms;

forming an airtight seal between said pressure-medium diaphragms and said mold; and shaping said powder by applying pressure isostatically from outside said jig.

4. The method for isostatic-pressing ceramic powder according to claim 3, in which said pressure-medium diaphragms are arranged after said open sides of said cavity have been covered with protective sheets.

5. The method for isostatic-pressing ceramic powder according to claim 3, in which said airtight seal between arranging a first pressure-medium diaphragm opposite one of said open sides of said cavity of said mold;

disposing ceramic powder in said cavity of said mold;

arranging a second pressure-medium diaphragm opposite the other of said open sides of said cavity of said mold;

forming a seal between said first and second pressure-medium diaphragms and said mold for preventing entry of a pressurizing medium into said cavity; and applying pressure isostatically to said first and second pressure-medium diaphragms to compact said ceramic powder.

7. The method of claim 6, wherein the step of forming a seal between said first and second pressure-medium diaphragms and said mold includes the step of:

fastening a first pressure-transfer plate to said mold so that said first pressure-medium diaphragm is secured around the periphery of said cavity; and fastening a second pressure-transfer plate to said mold so that said second pressure-medium diaphragm is secured around the periphery of said cavity.

8. The method of claim 7, wherein each of said first and second pressure transfer plates has a plurality of pressure holes.

9. The method of claim 8, wherein the step of applying pressure isostatically to said first and second pressure-medium diaphragms to compact said ceramic powder includes the step of:

transferring pressure from an external pressure medium to said first and second pressure-medium diaphragms through said pressure holes in said first and second pressure-transfer plates.

10. The method of claim 9, wherein said external pressure medium is a pressurizing fluid having a pressure of at least 300 $kgf/cm^2$ to compact said ceramic powder to form a planar ceramic green compact.

11. The method of claim 6, wherein prior to the step of arranging a first pressure-medium diaphragm, a first protective sheet is arranged opposite one of said open sides of said cavity of said mold, and, prior to the step of arranging a second pressure-medium diaphragm, a second protective sheet is arranged opposite the other of said open sides of said cavity of said mold.

* * * * *